Patented June 11, 1929.

1,716,478

UNITED STATES PATENT OFFICE.

ARTHUR BIDDLE, OF TRENTON, NEW JERSEY, ASSIGNOR TO UNITED PRODUCTS CORPORATION OF AMERICA, A CORPORATION OF DELAWARE.

METHOD FOR THE TREATMENT OF RUBBER AND LIKE SUBSTANCES AND THE PRODUCT THEREOF.

No Drawing.   Application filed December 30, 1925.   Serial No. 78,328.

My invention relates to dissolving, emulsifying or suspending rubber, gutta percha, or balata or like gums or substances or synthetic rubber materials in their crude, refined, treated or vulcanized states or as found in their latexes.

An object of my invention is to produce rubber or rubber like compositions adapted for many uses in the industrial arts, as, for example, coatings, sizings, glues, sealing compounds, gaskets, artificial silk and like fabrics, insulating materials, acid and alkali resistants, moulded articles and so forth.

Another object of my invention is to prepare or treat rubber and like gums in their various states and conditions as heretofore mentioned while in aqueous suspension or emulsion so that when subjected to friction, attrition, moderate heat, moderate evaporation (not complete dehydration) the said rubber or rubber like particles will not coalesce or form rubber like particles or lumps but will tend to redissolve or become redispersed in their aqueous vehicle.

A further object of my invention is to disperse vulcanized rubber or rubber like substances in an oil and then preserve or stabilize the dispersion, suspension or emulsion by an aqueous solution of a hydrophilic colloid.

A still further object of my invention is to treat the rubber or gum like particles as found in their natural latexes so as to prevent the coalescence or formation of rubbery lumps when subjected to friction, attrition, moderate heat or moderate evaporation (not, however, to complete dehydration) by uniting or combining such rubbery particles in the latex with an oil and then stabilizing the union by the addition of a hydrophilic colloid. The latex may either be in its natural sappy condition or after being treated with ammonia or other preservatives.

In carrying out my invention, when dealing with rubber as contained in rubber latex, I mix the oil, preferably neutral or slightly alkaline, and latex together and in order to accelerate the operation I apply moderate heat, preferably not to exceed the boiling point of water. In combining semi-drying or oxidizing oils with latex it is sometimes preferable to treat the rubber in the latex with a volatile or non-oxidizing oil thereby preventing the coagulation of the rubber out of the latex before the desired combining of the semi-drying or oxidizing oils with the latex has taken place; if a volatile oil is used, such as benzol, xylol, gasoline, carbon tetrachloride, it is preferable to carry out the process in a closed receptacle; continued agitation will cause the oils to dissolve or emulsify the rubber particles in the aqueous solution of the latex which action may be accelerated, if desired, by heat; if heavy oils, such as heavy petroleum oil, tar-oils or paraffine oils, are used about 40 pounds steam pressure and the accompanying heat may be necessary to bring about the desired action, the mixture in the meantime being agitated.

When unvulcanized, precipitated or coagulated substances are used it is preferable to granulate the rubber and treat it in the same manner as the latex. When vulcanized, reclaimed or synthetic rubbers or rubbery like gums are used the action is not primarily a solvent action as when the rubber is in its crude state or in the form of latex but is more of a dispersing of the particles and mechanical means besides heat and pressure may be desirable, if not essential, to bring about the dispersion. Such mechanical means may be supplied by combining the oil and the vulcanized rubbers through the agency of roller mills such as the ordinary printer's ink grinding mills.

After the said rubber in its various conditions and states has been dispersed, combined, treated, emulsified or suspended in or with the oils a hydrophilic colloid either in its dry form or in aqueous solution is added and the resultant mixture or compound is then thoroughly commingled, mixed or combined by stirring, rolling or other means of agitation. When the colloid is employed in dry form the water may be subsequently added. It will be understood that in practicing my new method, the hydrophilic colloid either dry or in an aqueous solution may be, in some instances, employed in the initial step and mixed with the rubber simultaneously with the oil. Among the hydrophilic colloids which may be advantageously used in carrying out my method are casein; starch; casein, hide, bone, fish or vegetable glues; soluble silicates; albumen; tapioca; soluble resins and soaps; colloidal clays, particularly bentonite. Some of these hydrophilic colloids, such as casein and tapioca, are best dissolved with the addition of alkalies, or combinations of alkalies, well known to the trades.

In the practice of my method the proportions and ingredients are variable so as to produce different products adaptable to different uses; for example, where the product is to be used as a coating composition the proportion of the aqueous solution of the hydrophillic colloid to a given quantity of the combined rubber and oil would be greater than if the product were to be used as a sealing compound. Additionally, the amount and the kind of oils used are dependent on the different species of hydrophilic colloids used; for example, if casein, which has a much greater quality of "holding up" than starch, be used, the amount of water required would be less than if the starch were used inasmuch as but little water is required to dissolve the casein while a greater proportion of water is required to dissolve starch. Again, when a cheap coating composition is desired, the kind of oil used would preferably be a semi-drying or oxidizing oil and in increased proportions over the rubber or the hydrophilic colloid.

As an example of carrying out my invention I will give the following, the product being especially adapted for use as a coating composition: 10 pounds of rubber are immersed in 100 pounds of oil, the oil being preferably a mixture of petroleum (1 pound), castor (3 pounds) and linseed (96 pounds) oils; the mixture is then subjected to agitation, heat and pressure until the rubber is dissolved, dispersed, suspended or emulsified. To this are added 75 pounds of a casein glue solution having a 20% casein content and from 5 to 10 pounds of a filling material such as clay and coloring matter, if desired. This mixture is then vigorously agitated until the ingredients thereof are thoroughly commingled and the product is ready for use. A vulcanizing agent, such as sulphur or soluble sulphur compounds, to the extent of about, for example, 1/4 pound of sulphur may or may not be added to the foregoing mixtures, the addition being dependent on the uses to which the product is to be put and the degree of waterproofness and flexibility desired. It will be understood that water may be added to the mixture as desired or expediency may require at any time following the combination of the oil and the rubber or the water may be added to the emulsified oil or to the original latex when latex is used, and that accelerating agents, such as formaldehyde, hexamethylamine tetra amine, and many others, toughening agents such as zinc oxide, antimony sulphide, filling materials already well known in the art, softening agents, dyes and coloring agents, may be used in making particular products. In some instances when a volatile oil is used the oil may not be desired in the finished product and therefore can be evaporated through the action of a vacuum to prevent undue evaporation of the water. Also, when for convenience in handling or shipping, it becomes desirable that the composition be free from water, the water may be allowed to evaporate and subsequently the composition may be cut up or granulated and the water later added to bring the composition to any desired degree of plasticity or viscosity, using heat, if necessary.

Having thus described my invention, I claim and desire to protect by Letters Patent of the United States:

A coating composition substantially comprising 10 pounds of rubber as contained in rubber latex, dispersed in 100 pounds of oil, the oil being a mixture of petroleum, castor, and linseed oils and 75 pounds of a casein glue solution having a 20% casein content.

In witness whereof, I have hereunto set my hand this 29th day of December, 1925.

ARTHUR BIDDLE.